US009221492B2

(12) United States Patent
Brenner

(10) Patent No.: US 9,221,492 B2
(45) Date of Patent: Dec. 29, 2015

(54) METHOD FOR OPERATING AN ELECTRICAL POWER STEERING MECHANISM

(75) Inventor: Peter Brenner, Moegglingen (DE)

(73) Assignee: Robert Bosch Automotive Steering GmbH, Gmuend (DE)

(*) Notice: Subject to any disclaimer, the term of this patent is extended or adjusted under 35 U.S.C. 154(b) by 0 days.

(21) Appl. No.: 14/241,605

(22) PCT Filed: Jun. 28, 2012

(86) PCT No.: PCT/EP2012/062525
§ 371 (c)(1),
(2), (4) Date: Feb. 27, 2014

(87) PCT Pub. No.: WO2013/037524
PCT Pub. Date: Mar. 21, 2013

(65) Prior Publication Data
US 2014/0214277 A1 Jul. 31, 2014

(30) Foreign Application Priority Data
Sep. 14, 2011 (DE) .......... 10 2011 063 580

(51) Int. Cl.
B62D 5/00 (2006.01)
B62D 5/04 (2006.01)
(Continued)

(52) U.S. Cl.
CPC .............. *B62D 5/0484* (2013.01); *B62D 5/049* (2013.01); *G06F 11/0796* (2013.01); *G06F 11/1487* (2013.01); *G06F 11/165* (2013.01); *G06F 11/1641* (2013.01)

(58) Field of Classification Search
CPC ....... B62D 5/04; B62D 5/0463; B62D 5/0484
See application file for complete search history.

(56) References Cited

U.S. PATENT DOCUMENTS

| 4,621,327 A * | 11/1986 | Dolph et al. ............... 701/43 |
| 2004/0026158 A1 * | 2/2004 | Rieth et al. ............... 180/402 |
| 2009/0084616 A1 * | 4/2009 | Kezobo et al. ............ 180/6.44 |

FOREIGN PATENT DOCUMENTS

WO  WO-2010/031520  3/2010

OTHER PUBLICATIONS

German Office Action dated Jun. 6, 2012 for German Application No. 10 2011 053 580.2.
Baleani, M. u.a.: Fault-Tolerant Platforms for Automotive Safety-Critical Applications. In: Proceedings of the 2003 international conference on Compilers, architecture and synthesis for embedded systems, 2003, S. 170 - 177, ISBN: 1-58113-676-5.

(Continued)

*Primary Examiner* — Calvin Cheung
*Assistant Examiner* — Martin Weeks
(74) *Attorney, Agent, or Firm* — Jordan and Hamburg LLP

(57) ABSTRACT

A computer and function architecture for operating an electrical power-assisted steering system, comprises a control path and a monitoring path that has a diverse design in relation thereto and which are processed basically parallel to each other in each case on two associated cores of a redundant microcomputer, and arithmetic differences that occur within the control path or the monitoring path are detected at the functional level by way of a comparator, and the results of individual computing steps are detected at the granular level by way of a core comparator, and as a result of a detected difference of the comparator at the functional level, a transition is made into an emergency operating mode in the event that the core comparator has not diagnosed an arithmetic error, so as to ensure further availability of at least some of the steering assistance function or of the steering functions over at least a certain time period.

3 Claims, 3 Drawing Sheets

(51) Int. Cl.
  *B62D 5/18* (2006.01)
  *B62D 6/00* (2006.01)
  *B62D 6/10* (2006.01)
  *G06F 11/07* (2006.01)
  *G06F 11/16* (2006.01)
  *G06F 11/14* (2006.01)

(56) References Cited

OTHER PUBLICATIONS

Koepernik, Dr. J. ua.: Funktionale Sicherheit in der Entwicklung von Fahrwerks and fahrerassistenz-Systemen: Fokus Systemarchitektur. Vector Congress, 7./8. Oktoberr 2008.

* cited by examiner

METHOD FOR OPERATING AN ELECTRICAL POWER STEERING MECHANISM

BACKGROUND OF THE INVENTION

The present invention relates to a computer and function architecture for operating an electrical power-assisted steering system, wherein the control unit has a computer architecture comprising a redundant core, referred to as a dual-core processor.

When using a microcomputer to compute and control the steering assistance function of an electrical power steering system, faults in the computer core must be detected and, in the event of a fault, the system must be shut down since reliable computation and control can no longer be ensured, According to the prior art, a fault in the arithmetic core of the microcomputer is verified by way of double computation of the steering assistance function. The computational algorithms required for this purpose are designed to be diverse. If the results of a control path (Level 1) differ from the diverse monitoring path (Level 2), a fault is assumed to exist in the arithmetic core. Subsequent to a detected difference, the system must be shut down as quickly as possible and thereby transferred into a safe state. However, shutting down the steering assistance function is associated with major limitations for the driver in terms of comfort. Typical output variables include a setpoint value specification for the assistance torque of the servo-motor, however depending on the scope of functions, these may also include the output of steering-internal variables, such as the steering angle information for partner control units.

DESCRIPTION OF THE PREFERRED EMBODIMENTS

Figure 1:
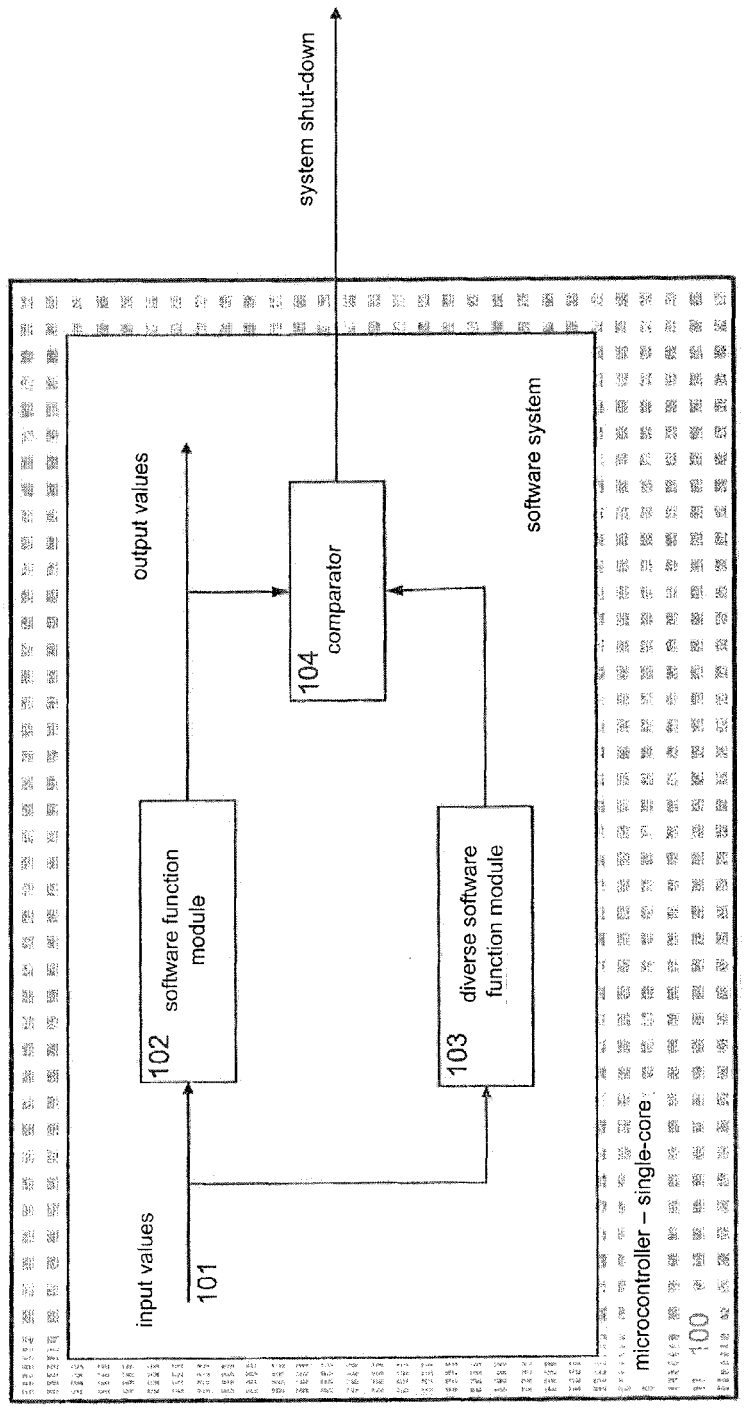
FIG. 1 shows a computer architecture according to the prior art.

In a single-core microcontroller unit (100), input values (101) are supplied to a control path (102), which includes individual software (SW) function modules, and a monitoring path (103), which has an appropriate diverse structure (diverse software function module).

Typically, the measured torsion bar torque, which is sensed by way of a sensor in the steering shaft, is used as the input variable. Based on this, a setpoint value specification is ascertained for the assistance torque as an output variable, using steering functions, and optionally further steering comfort functions.

Differences in the results of function computations of the control path (102) and of the monitoring path (103) are established by way of a comparator (104).

The monitoring path (103) implements a diverse software function module corresponding to the primary software function module, wherein an algorithm that is different from the control path is used.

The comparator (104) compares the results at the functional level so as to detect systematic faults in the software.

If the comparator establishes a difference, an arithmetic error or a systematic software fault can be assumed. The entire system is immediately shut down in response to a different result (system shut-down).

When a redundant core microcomputer (200) is used, which is a computer in which two identical arithmetic units (Core 1, Core 2) are integrated on one chip, it is provided that arithmetic instructions are basically carried out simultaneously and parallel to each other. The individual computing results are automatically compared at the granular level by way of a core comparator (205). In the event that there is a difference in the results of the two ALUs, a corresponding fault response is triggered. This generally results in a shut-down, and thus the transition into the safe system state.

The introduction of the ISO 26262 safety standard demands measures for detecting systematic software faults. This requirement can be met, for example, by implementing diverse algorithms of the control path and of the monitoring path (see prior art).

If a difference now occurs between the control path and the monitoring path in a system thus designed, it does not involve an arithmetic error, but a systematic software fault or an operating state of the system which cannot be diagnosed by way of one level or both levels. If this state occurs, the system is likewise subjected to a "hard" shut-down.

A dual-core microcontroller according to the prior art likewise comprises a core comparator that is implemented in hardware. This comparator compares the individual computing steps of the ALUs of both cores of the microcomputer at the granular level.

If a fault now occurs in the diverse computation and the core comparator does not establish a difference in the computation of the two cores (Core 1, Core 2), a fault consequently exists in the software, or an uncontrollable system state is present.

The solution according to the invention does not provide for a hard shut-down of the system in this case, but instead provides for a transition into an emergency operating mode, in which safe driving of the vehicle can be ensured, optionally with a limited comfort level as compared to full operation.

A computer and function architecture for operating an electrical power-assisted steering system is thus proposed, in which a control path and a monitoring path that has a diverse design in relation thereto are processed basically parallel to each other in each case on two associated cores of a redundant microcomputer, and arithmetic differences that occur within the control path or the monitoring path are detected at the functional level by way of a comparator, and the results of individual computing steps are detected at the granular level by way of a core comparator, and as a result of a detected difference of the comparator at the functional level, a transition is made into an emergency operating mode in the event that the core comparator has not diagnosed an arithmetic error, so as to ensure further availability of at least some of the steering assistance function or of the steering functions over at least a certain time period.

The invention further provides that the emergency operating mode is implemented by way of a dedicated control program (emergency operating program). The emergency operating program can be implemented by appropriate implementation and parameterization of the control program in relation to the run time (in the event of a fault).

For this purpose, the output values are computed in the emergency operating mode by the emergency operating program.

In a particularly preferred embodiment variant of the invention, it is provided that the emergency operating program is implemented as a separate module (emergency operating program) and kept on stand-by for execution in the program memory. During normal operation, which is to say, in fault-free operation, this is not carried out. It is only activated if a fault is diagnosed.

According to the invention, it is provided that the emergency mode operates according to one of the strategies listed below:

steering assistance is limited to a value that is designed to be reduced as compared to a normal value; or
steering assistance is limited to a value that is designed to be reduced as compared to a normal value, wherein the reduction is made as a function of the situation and/or in a time-controlled manner by way of a ramp; or
steering assistance is reduced to the value zero, wherein the reduction is made as a function of the situation and/or in a time-controlled manner by way of a ramp.

The method is carried out on a dual-core microcomputer in a control device 190 or in a combined engine/control device unit. The invention also comprises a power-assisted steering system 10 that is equipped with a corresponding control device 190 or a combined engine/control device unit.

Figure 2:
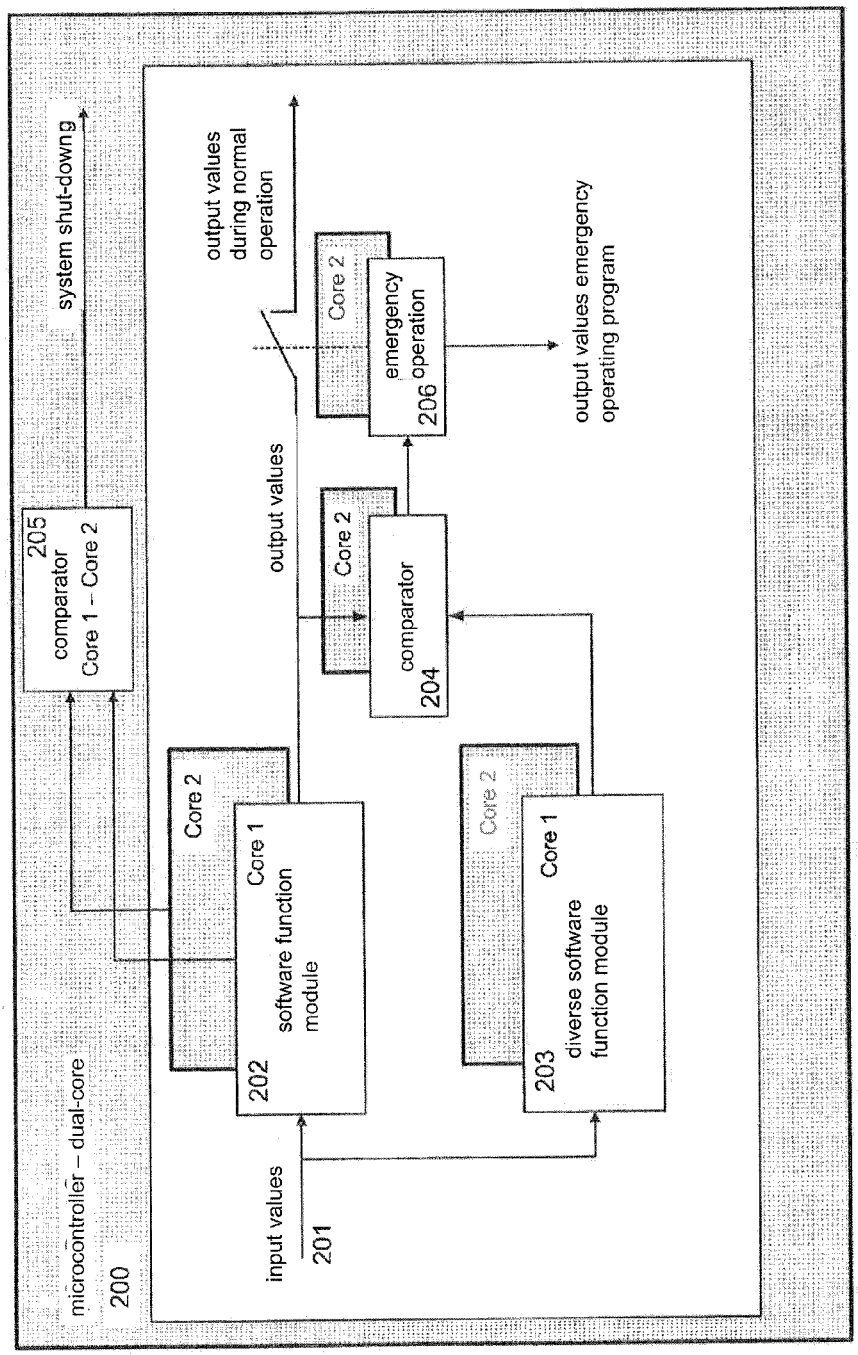
FIG. 2 shows an exemplary embodiment according to the invention.
Figure 3:
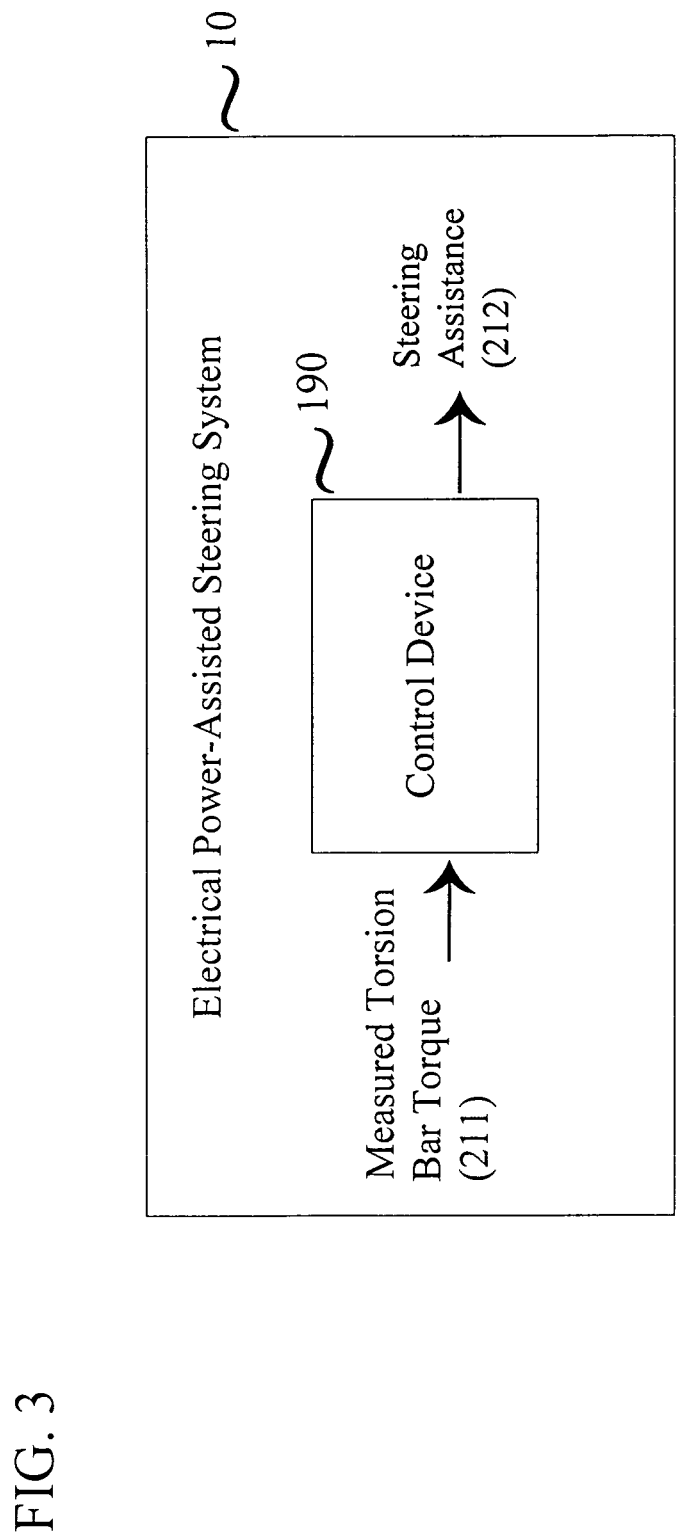
FIG. 3 shows a block diagram of the electrical power-assisted steering system., including the control device of FIG. 2.

FIG. 2 shows an exemplary embodiment according to the invention.

In a control device (190) comprising a microcomputer having a redundant core (200), input values (201) (e.g., measured torsion bar torque (211)) are simultaneously supplied, parallel to each other, to a control path (202), which includes individual software function modules, and to a monitoring path (203), which has a corresponding diverse structure. The monitoring path implements a diverse software function module corresponding to the primary software function module, wherein an algorithm that is different from the control path is used. Granular computing differences of the two cores (Core 1, Core 2), are compared by way of a core comparator (202) represented in hardware at the processor level. If a difference is established by way of the core comparator (202), a hard shut-down (system shut-down) of the entire system is carried out.

The monitoring path (203) and the control path (202) are basically computed simultaneously and parallel to each other on the two cores of the microcontroller (Core 1, Core 2). Differences in the results of the function computations of the control path (202) and of the monitoring path (203) are established by way of a comparator (204), wherein the comparator (204) operates at the functional level so as to detect systematic faults in the software.

If the comparator (204) establishes a difference, and if the core comparator (205) has not established an arithmetic error of the cores (Core 1, Core 2), a systematic software fault or an uncontrollable system state can be assumed.

In this case, it is provided to transition into an emergency mode implemented as an emergency operating program (206). The emergency operating program must allow at least safe driving of the vehicle. Compared to normal operation, limitations in terms of the available comfort level may be tolerated during the emergency operating mode.

For this purpose, for example, the emergency operating program makes the following minimum steering functions available:

First option: only absolutely necessary steering assistance (212) is made available for an unlimited time; or Second option: Steering assistance (212) is reduced by way of a situation-controlled and/or time-controlled ramp so that the driver does not perceive any unpleasant or surprising torque curve at the steering wheel.

However, the driver can continue to safely drive the vehicle and bring it to a halt, however without steering assistance.

The invention claimed is:

1. A power-assisted steering system, comprising:
a dual core microcontroller unit that receives input signals including a measured torsion bar torque input and generates output signals for controlling steering assistance;
wherein the dual core microcontroller unit comprises:
a first program module stored in memory and executed by a first core of the microcontroller unit, and that implements a control path during execution; and
a second program module stored in memory and executed by a second core of the microcontroller unit, and that implements a monitoring path during execution;
wherein the first module and the second module are executed synchronously in parallel to each other;
wherein arithmetic differences that occur within the control path or the monitoring path are detected by a first comparator circuit of the microcontroller unit;
wherein results of individual computing steps of the first program module and the second program module are detected at the granular level by a core comparator, and as a result of a detected difference of the first comparator circuit, a transition is made into an emergency operating mode in the event that the core comparator has not diagnosed an arithmetic error, so as to ensure further availability of at least some steering assistance over at least a certain time period.

2. The power-assisted steering system according to claim 1, wherein the emergency operating mode is implemented by a dedicated emergency operating program executed by the microcontroller unit.

3. The power-assisted steering system according to claim 1, wherein during the emergency operating mode the microcontroller unit controls one of the following operations:
limiting steering assistance to a value that is designed to be reduced as compared to a normal value;
limiting steering assistance to a value that is designed to be reduced as compared to a normal value, wherein the reduction is made as a function of the situation and/or in a time-controlled manner by way of a ramp; and
reducing steering assistance to the value zero, wherein the reduction is made as a function of the situation and/or in a time-controlled manner by way of a ramp.

* * * * *